United States Patent [19]

Stern et al.

[11] 4,227,356
[45] Oct. 14, 1980

[54] COMPOSITE FOAM ROOF INSULATION

[75] Inventors: Eric P. Stern, Dollard Des Ormeaux; George J. Venta, Pointe Claire; Riad Mia, Pont Rouge; Solomon M. Vines, Montreal, all of Canada

[73] Assignee: Exxon Research & Engineering Co., Florham Park, N.J.

[21] Appl. No.: 889,793

[22] Filed: Mar. 23, 1978

[51] Int. Cl.² .................................................. E04C 2/26
[52] U.S. Cl. ..................................... 52/309.4; 52/451; 52/674; 428/137; 428/156; 428/314
[58] Field of Search .................. 52/309.9, 309.11, 451, 52/795, 674, 309.5, 450, 673, 675, 794, 449, 309.4; 428/322, 321, 314, 320, 182, 160, 163, 137, 131, 156

[56] References Cited

U.S. PATENT DOCUMENTS

| | | | |
|---|---|---|---|
| 1,115,593 | 11/1914 | Sexton | 52/449 |
| 1,177,361 | 3/1916 | Schumacher | 52/449 |
| 2,694,025 | 11/1954 | Slayter | 428/321 |
| 3,135,069 | 6/1964 | Schuller | 52/411 |
| 3,174,887 | 3/1965 | Voelker | 156/79 |
| 3,246,058 | 4/1966 | Voelker | 428/322 |
| 3,345,245 | 10/1967 | Hanusa | 428/182 |

FOREIGN PATENT DOCUMENTS 2228607 12/1974 France ............................ 156/78

*Primary Examiner*—John E. Murtagh
*Attorney, Agent, or Firm*—Myron B. Kurtzman

[57] ABSTRACT

A heat-insulating sandwich-like composite comprising a core of foamed resin based compound sandwiched between and adhering to single face corrugated board with a high wet strength. The single face corrugated board is perforated prior to foaming of the resin based compound so as to allow the excess of volatile matter to escape and some foaming mixture to penetrate inside the corrugated flute. The composite board further is provided with post-perforations made after foaming the resin compound between the corrugated board skins.

8 Claims, 3 Drawing Figures

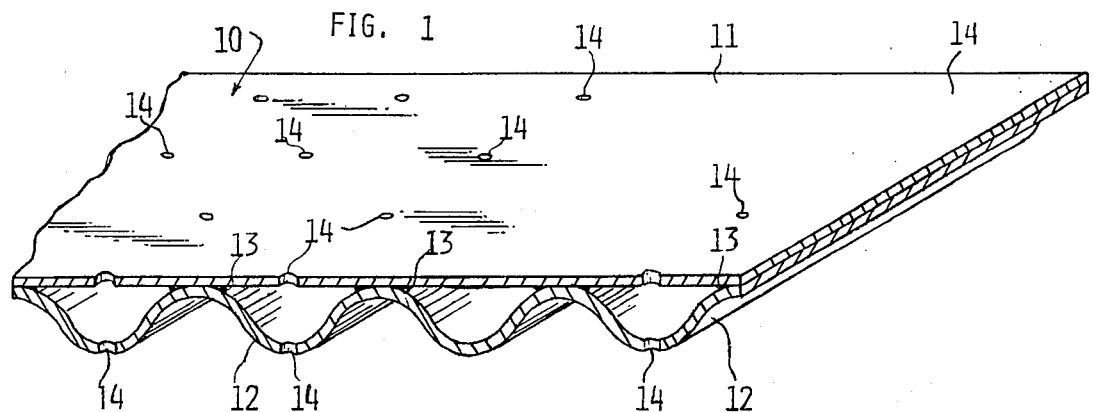
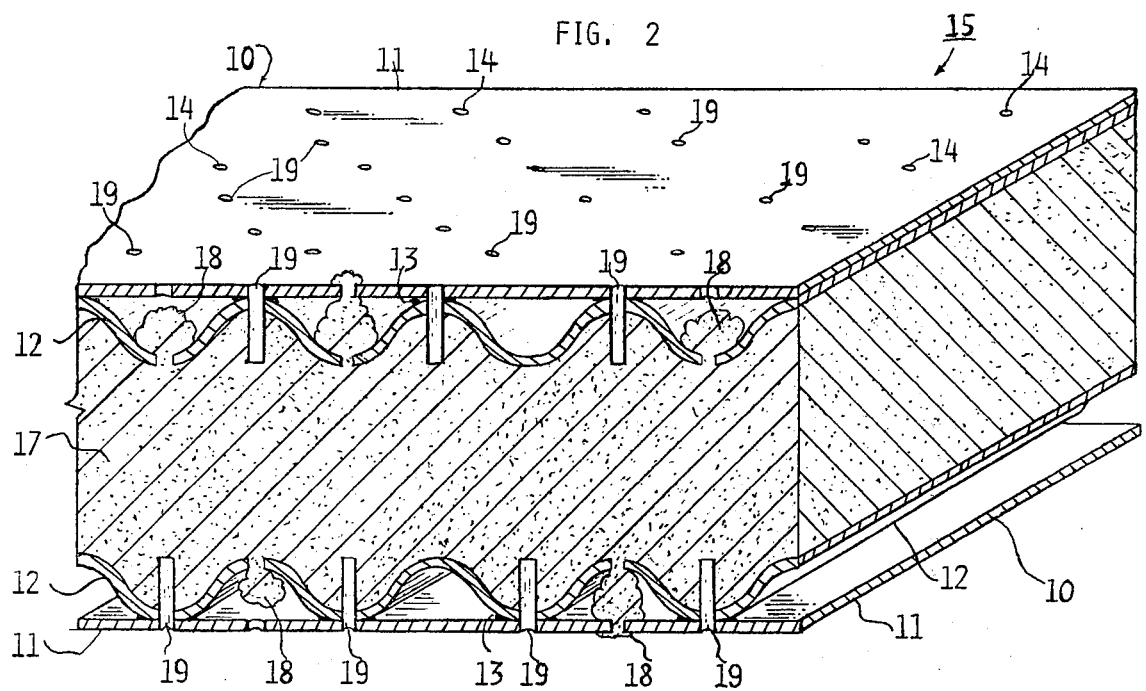
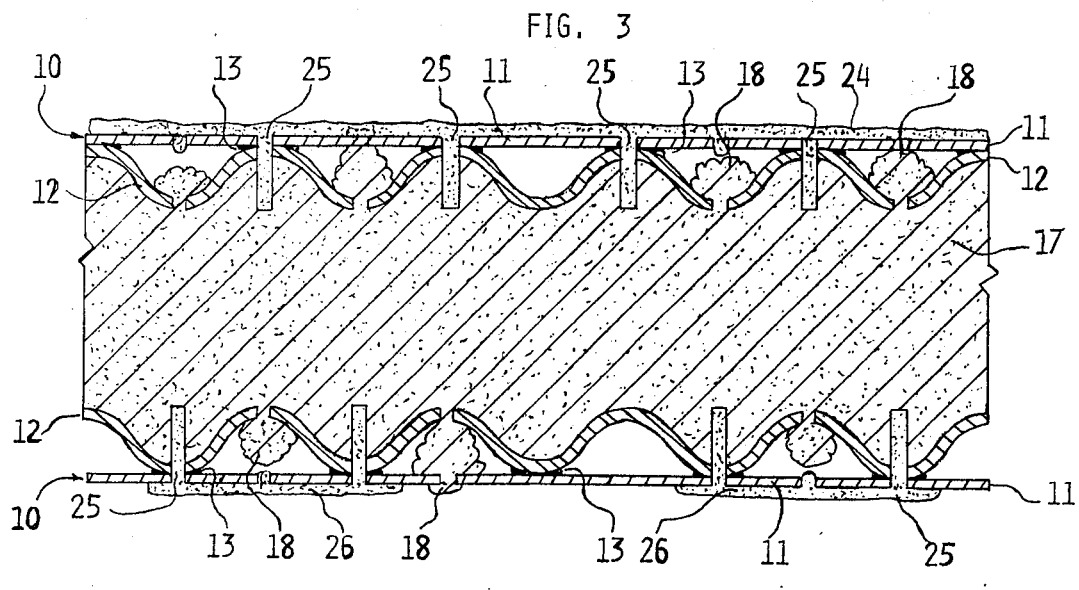

COMPOSITE FOAM ROOF INSULATION

BACKGROUND OF THE INVENTION

1. Field of the Invention

The present invention relates to improved multi-cellular foamed elements of thermoplastic or thermosetting resin based compounds such as for example, phenolic aldehyde resin based compositions, sandwiched between corrugated material. More particularly, the instant invention relates to improved sandwich-like composites comprising a core of foamed material such as a phenol formaldehyde resin compound sandwiched between and adhering to corrugated paper skins, said paper containing perforations made prior to the foaming of the foamable resin and the composite board being post-perforated after foaming the resin based compound between the two skins. The roof heat-insulating composite boards meet mechanical and heat insulating performance requirements at lower foam densities than similar composite materials with straight skins. At the same time the level of curling under conditions of one sided heating, e.g., during construction of a built-up roof, is reduced compared with other more incompressible skin composites. These roof insulating boards, when installed in built up roofs reduce the tendency of membrane blistering in conditions of large temperature changes, e.g., day and nightime.

2. Description of the Prior Art

The insulating properties of foamed plastic materials are well known. Indeed, a most frequently cited advantage of foamed resins, is their very low thermal conductivity. For example, the low thermal conductivity of foamed thermoset phenol formaldehyde materials causes them to be useful as insulating boards used in building structures such as partition walls, bulk heads, ceilings, floors, storage tanks, walls and roof structures.

When employed in roof structures, the insulating material must have sufficient strength to support bituminized roofing felt, asphalt, gravel and the like. More particularly, the boards should have sufficient strength to support the weight of a person or persons that may be required to work on the roof during the laying down of the bituminized roofing felt, asphalt, gravel and the like or person or persons that from time to time may be required on the completed roof. Typically, for phenolic foam composites sandwiched between skins, such as paper, the density is about 1.5 to about 4.5 lb./ft$^3$ thereby having the strength to support such persons and their equipment.

The phenol formaldehyde resin based foamed material can be sandwiched between protective skins of paper, such as wood fiber based felt or creped kraft paper. With a reduction in the density of the foam, the rigidity and strength of the protective skins must necessarily be increased in order to support and distribute a load that may be placed upon the insulating board. If felt skin is used to protect the foam, curling becomes a problem. Curling occurs because the moisture which is present or absorbed in the foam, travels from the hot side of the board to the cool side of the board upon exposure of the board to the sun during the roofing operation.

In order to overcome the curling problem, it has been suggested that creped kraft paper be substituted for wood fiber felt paper.

This type of composite insulation board however, if installed in a built up roof system tightly enclosed between a flat support covered with a vapour retarder and the overlying roofing membrane, allows no fast relief for the pressure that can build up by the expansion of air and/or water vapour between the board and the roofing membrane during periods of high temperature exposure. This results in the blistering of the membrane leading to eventual membrane failure and roof leaks.

The advantage of the corrugated skin composite insulating board is that the equilibration of the pressure in a built up roof is enhanced in such conditions by the presence of the corrugated flutes which act as pressure equilibration channels.

Therefore it is particularly desirable to provide a roof-insulating board which has strong skins thereby allowing for the reduction of the foam density employed between the skin while maintaining the required mechanical and thermal insulating properties of the board. It is particularly desirable to provide a roof insulating board which manifests reduced curling under the heat of the sun. In addition, it is particularly desirable to provide a roof insulating board which diminishes the tendency of tightly built up roof systems to blister under conditions where pressure builds up due to high temperatures. It is also desirable to provide a roof insulating board which has a high mechanical strength in conditions of high humidity in built up roof systems, thus resisting the uplift produced by high winds.

U.S. Pat. No. 2,973,295 of Rodgers, Jr. issued Feb. 28, 1961 describes a process for incorporating foamable materials in corrugated paperboard. U.S. Pat. No. 3,821,337 of Bunclark et al describes a process for controlled curing of foams such as foamed phenol-aldehydes employed in insulating boards. U.S. Pat. No. 3,536,575 of Maitrot issued Oct. 27, 1970 describes a method of producing sandwich like heat-insulating boards. U.S. Pat. Nos. 3,741,920 issued June 25, 1973 and 3,726,708 issued Apr. 10, 1973 each assigned to Dynamit Nobel Atktiengesellschaft describe phenolic resin foams which may be used as the core material in the manufacture of heat-insulating board. U.S. Pat. Nos. 3,694,387 of Junger et al issued Sept. 26, 1972, 3,779,956 of Pintin et al issued Dec. 18, 1973, 3,877,967 of Junger et al issued Apr. 15, 1975 and 3,953,645 of Moss issued Apr. 22, 1976 each describe phenolic resins which can be employed in the manufacture of heat-insulating board.

SUMMARY OF THE INVENTION

The present invention provides an insulating board of a foamed resin such as thermostat phenol-aldehyde resin and particularly of a phenol formaldehyde resin, said heat-insulating board being a sandwich-like composite comprising a core of the foamed resin compound sandwiched between and adhering to corrugated material skins, such as single faced corrugated paper. The corrugated material is provided with a plurality of perforations which are present prior to the foaming of the foamable resin compounds. The insulating boards are provided with perforations after the foamed resin compound reaches a degree of curing when it is rigid enough to be perforated. As used herein, the skin perforations made before foaming of the resin compounds will be called pre-perforations whereas the holes made in the insulating board after the hardening of the foamed material will be called post-perforations.

The use of perforated corrugated medium as the protecting skin for the foamed resin compound permits a reduction in the density of the foamed resin while maintaining the required mechanical and thermal insulation properties.

It is therefore an object of this invention to provide an improved heat-insulating composite board which is a sandwich-like composite, comprising a core of foamed resin compound sandwiched between and adhering to corrugated material.

It is another object of this invention to provide a composite roof heat-insulating board which manifests reduced curling when subjected to increased temperatures from one of the faces.

It is still another object of this invention to provide composite roof heat-insulating board which reduces the tendency of tight built up roof systems to blister when subjected to increased temperatures.

It is still another object of this invention to provide heat-insulating composite board which does not crack and/or warp as a result of the shrinkage of the foamed material.

It is yet another object of this invention to provide a heat-insulating composite board which evidences good bond strength between the foam and the protective skin.

Other and additional objects of this invention will become apparent from a consideration of this entire specification and drawings, including the claims hereof.

BRIEF DESCRIPTION OF THE DRAWINGS

FIG. 1 is a cross-sectional elevation of the corrugated single face employed as the protective skin for the foamed heat-insulating resin.

FIG. 2 is a cross-sectional elevation in perspective of the heat-insulating sandwich-like composite illustrating a core of foamed resin sandwiched between and adhering to corrugated material.

FIG. 3 is a cross-sectional elevation illustrating the heat-insulating sandwich-like composite of this invention coated with a roofing medium such as asphalt and bonded to the roof support with a suitable adhesive.

DETAILED DESCRIPTION OF THE INVENTION

Referring now to the drawings (wherein like numbers refer to like parts), in particular in FIG. 1, there is shown a single face corrugated skin 10 comprising the outer liner 11 and the corrugated medium 12. In a preferred embodiment of this invention the medium is corrugated paperboard. In order to ensure a firm bond between the outer liner and corrugated medium, the outer liner 11 and corrugated medium 12 are adhered to each other by means of high wet strength adhesive 13. In accordance with the preferred embodiment of this invention the corrugated skin 10 is provided with pre-perforations 14 which pass through the corrugated medium 12.

As illustrated in FIG. 2, a composite foam roof-insulating board 15 comprising upper and lower corrugated skins 10 having therebetween foamed resin compound 17 is provided with increased adhesion between the skin 10 and foam 17 as a result of the reduction of the amount of volatile materials accumulated under the skin during the manufacturing process and of the foamable resin compound passing through perforations 14 shown in FIG. 1 and forming high density foam plugs between medium and liner 18, thereby providing an improved bond strength between the foam and the skin, and between the liner and the medium within the skin.

The heat-insulating board is now provided with a plurality of post-perforations 19 which provide for an increased bond between the foam, the skins and the roof support on the side of the insulation board and the roofing membrane on the other side, by means of the roofing adhesive 26 and the roofing asphalt 24, which penetrate through the holes 19 during the process of applying the insulating board on the roof forming plugs 25 as shown in FIG. 3. The plugs 25 provide a firm water resistant bond between the asphalt or roofing adhesive and the heat-insulating board. A similar strong water resistant bond is provided through the bottom corrugated skin to the roofing support by the roofing adhesive 26, penetrating through the botton board perforations 19.

The corrugated skin, as illustrated in the drawings can be constructed from a variety of materials, for example, metallic corrugated material such as aluminum; thermoset or thermoplastic resins such as polyesters, polyethylene, polypropylene, polyvinyl chloride, polycarbonate and the like. In accordance with the preferred embodiments of this invention, the corrugated skin is constructed from single faced corrugated paper. In addition to the improved properties obtained, such as the reduction in foam density, the low tendency of curling and the incorporation of pressure equilibrating corrugated flutes which reduce the blistering propensity of the built up roof membrane, corrugated paper skin 10 shrink with the foam during the curing process, thereby practically eliminating the foam cracking and board warping in the finished product, which may occur when the skins of the composite do not shrink or expand both to the same degree as the core materials, i.e., the foam. Preferably, the liner and the medium used in the manufacture of the single faced skin will be of a weight in the range of about 26 lb./1000 ft$^2$ to about 42 lb./1000 ft$^2$.

The core material can be made from any number of foams made from resins such as polyisocyanurates, polystyrene, polyurethanes, ureaformaldehyde and phenolicaldehyde or glass. Preferably the foams used for the purposes of the present invention have such a thermal insulation value, that the reduction in foam density achieved by using the strong skins and the elimination of part of the foam between the 2 flat extreme surfaces of the board by the corrugated flutes, will not significantly affect the thermal insulation value of the composite board.

The foamable phenolic resol resins preferred and in accordance with this invention, are products of the condensation of one mole of a phenol with 1 to 3 moles of an aldehyde. The condensation can typically take place in an alkaline medium. Not only phenol itself can be employed by also homologs and alkyl substituted products, such as resorcinol, pyrocatechol, cresols, xylenols, or mixtures of these compounds. The aldehydes reacting with the phenols include formaldehyde, paraformaldehyde trioxane, acetaldehyde, furfural and hexamethylenetetramine as well as mixtures of these compounds. In accordance with the preferred embodiment of the invention the foamable resin compound is based on phenolformaldehyde resin.

The preparation of the resin and its foaming are well known in the chemical arts as well as the roofing arts and needs no further elaboration herein, an adequate description of the production of phenolic-aldehyde foams being described in the references mentioned above and incorporated herein by reference. The density of the foam is generally in the range of about 1.5 to about 4.5 lb./ft$^3$ and preferably about 2 to 3.5 lb./ft$^3$.

As mentioned above, the liner and the corrugated medium are adhered together by means of a wet strength adhesive. By wet strength adhesive it should be understood that any adhesive which maintains the bond between liner and medium, over a long period of time of water immersion, can be employed. Preferably in accordance with the invention described herein, the wet strength adhesive is a thermosetting polyvinyl acetate based glue.

As illustrated in the drawing and in accordance with the invention, the corrugated medium is provided with pre-perforations before the application of foamable resin. Upon foaming, the foamable resin compound penetrates into the pre-perforations and during curing locks into the corrugated paper, thereby providing for increased adhesion between the paper skin and the foam. The pre-perforations furthermore allow the volatile materials to escape during the foaming process, thereby aiding in and facilitating excellent contact between the foam and the paper to which the foam will naturally adhere.

The post-perforations allow some asphalt and/or other roofing adhesive to penetrate through the skin and even into the foam, and thus improve the bond of the roofing membrane and of the roof support to the insulating board even in conditions of high levels of moisture.

The heat-insulating panels of this invention can be made by means well knonw in the art. For example, the formable resin compound can be placed between an upper and lower corrugated paper skin containing pre-perforations. The foamable resin compound is then caused to foam and thereafter allowed to cure. The insulating board can be provided with the post-perforations during the curing operation, however, the post-perforations can be placed into the board at any time after the foam becomes rigid enough to be handled with a perforating equipment.

Desirably, the manufacture of the panels will be in accordance with a continuous method similar to that described in U.S. Pat. No. 3,821,337 of Bunclark issued Jan. 28, 1974 which reference is incorporated by reference in its entirety. The reference not only describes a continuous process but also describes resins which may be employed.

EXAMPLE 1

Two by four foot heat-insulating roofing panels comprising phenol-formaldehyde resin based foam of approximately 3.0./ft.$^3$ density sandwiched between single faced kraft corrugated board made of liner and medium having a weight of 26 lb./1000 ft.$^2$ ("B" type flutes) and containing about 1152 perforations evenly divided between the pre-perforations and post-perforations, were adhered to a roof and exposed to the hot sun (about 70° C.). After one hour of exposure there was a minimum amount of curling at the corners. The curling slowly reversed once 4 plies of asphalt saturated organic roofing felts were applied with asphalt and the system was gravelled over.

The number of perforations per square foot of board can vary greatly. Typically, there can be from about 100 to 2500 perforations. However, greater and lesser amounts can be punctured into the board, preferably about 450 to about 600. The perforations can be punctured into the board by a multiple of methods, for example, by means of pick-like tools. It is however important to leave 5–25% of the corrugated flutes unperforated in order to avoid blocking the pressure release paths which reduce the tendency of membrane blistering tendency in built up roofs.

EXAMPLE 2

Two by four foot heat insulating roofing panels from Example 1 were built into an experimental built-up roof deck wrapping them between vapour retarder at the bottom and a 4-ply asphalt saturated cellulosic fiber felt membrane covered with roofing gravel on the top. The roof deck was heated to approximately 70° C. from above the surface in cycles reproducing the conditions of raising and lowering temperature due to sunrise and sunset during a sunny summer day in a temperate climate region. After more than 100 such cycles, no signs of blistering of the membrane were observed. In a similar experiment, where a phenol-formaldehyde resin based foam was sandwiched between creped kraft skins and two by four foot panels were built into the same built up roof system, cycling under equal conditions produced blisters between the roofing membrane and the insulating panels within the first 40 cycles.

EXAMPLE 3

Two by four foot heat insulating roofing panels from Example 1 were applied on a corrugated steel roof support. An asphalt buggy with a total weight of 450 lbs. was passed several times on the top of these panels. An operator walked thereafter on these panels completing about 20 trips on the top of a specific strip of the panels. The panels did not show any deterioration as a result of this treatment thus demonstrating adequate structural strength.

What is claimed is:

1. A heat-insulating sandwich-like foam composite roofing panel comprising a core of foamed resin compound in adhering contact with, sandwiched between and penetrating into corrugated material comprising an outer liner and corrugated medium, the corrugated medium containing a plurality of pre-perforations, the outer liner containing a plurality of post-perforations for receiving roofing adhesive, the corrugated medium and outer liner being bonded together with a wet strength adhesive selected from adhesives which maintain the bond between the outer liner and corrugated medium over long periods of immersion in water.

2. The heat-insulating sandwich-like composite of claim 1 wherein said corrugated material is single faced corrugated paper.

3. The heat-insulating sandwich-like composite of claim 1 wherein said foamed resin is a phenolic-aldehyde resin compound.

4. The heat-insulating sandwich-like composite of claim 3 wherein said phenolic-aldehyde resin is a phenol formaldehyde resin compound.

5. The heat-insulating sandwich-like composite of claim 1 wherein said adhesive contains a polyvinyl acetate or similar thermosetting polymer.

6. The heat-insulating sandwich-like composite of claim 1 wherein the density of the foam is in the range of from about 1.5 to about 4.5 lb./ft.$^3$.

7. The heat-insulating sandwich-like composite of claim 6 wherein the density of the foam is in the range of from about 2.0 to about 3.5 lb./ft.$^3$.

8. The composite foam roof insulator of claim 7.

* * * * *